US012151499B2

(12) United States Patent
Kohl et al.

(10) Patent No.: US 12,151,499 B2
(45) Date of Patent: Nov. 26, 2024

(54) IDENTIFICATION DOCUMENT HAVING BIOMETRIC IMAGE INFORMATION

(71) Applicant: Veridos GmbH, Berlin (DE)

(72) Inventors: Klaus Kohl, Miesbach (DE); Günter Endres, Munich (DE)

(73) Assignee: Veridos GmbH, Berlin (DE)

( * ) Notice: Subject to any disclaimer, the term of this patent is extended or adjusted under 35 U.S.C. 154(b) by 433 days.

(21) Appl. No.: 17/426,616

(22) PCT Filed: Jan. 31, 2020

(86) PCT No.: PCT/EP2020/025044
§ 371 (c)(1),
(2) Date: Jul. 28, 2021

(87) PCT Pub. No.: WO2020/156759
PCT Pub. Date: Aug. 6, 2020

(65) Prior Publication Data

US 2022/0134792 A1 May 5, 2022

(30) Foreign Application Priority Data

Feb. 1, 2019 (DE) ..................... 10 2019 000 739.5

(51) Int. Cl.

| | |
|---|---|
| ***B42D 25/23*** | (2014.01) |
| ***B42D 25/00*** | (2014.01) |
| ***B42D 25/309*** | (2014.01) |
| ***B42D 25/41*** | (2014.01) |

(52) U.S. Cl.
CPC ............. *B42D 25/23* (2014.10); *B42D 25/00* (2014.10); *B42D 25/309* (2014.10); *B42D 25/41* (2014.10)

(58) Field of Classification Search
None
See application file for complete search history.

(56) References Cited

U.S. PATENT DOCUMENTS 6,633,321 B1 10/2003 Maurer
8,025,239 B2 9/2011 Labrec et al.
(Continued)

FOREIGN PATENT DOCUMENTS

DE 102011117677 A1 5/2013
KR 20170029882 A * 3/2017
(Continued)

OTHER PUBLICATIONS

WO-2014096167-A1 English Translation (Year: 2014).*
(Continued)

*Primary Examiner* — Kyle R Grabowski
(74) *Attorney, Agent, or Firm* — Frank Rosenberg

(57) ABSTRACT

An identification document (1) with a personalization region (3) for receiving biometric image information (5) is proposed. The personalization region (3) comprises a recording layer (11) for image information as well as a lens arrangement (20). Viewing the biometric image information (5) is effected through the lens arrangement (20). The biometric image information (5) holds basic information (12) consisting of a base image (15) and a derivative image (16) derived from the base image (15). The derivative image (16) shows or emphasizes a constituent of the base image (15) that is essential for recognition. At a first viewing angle (α1) the base image (15) is dominantly recognizable, at a second viewing angle (α1) the derivative image (16), so that in the perception of the image information combined from base image (15) and derivative image (16) a plastic overall impression arises.

20 Claims, 4 Drawing Sheets

(56) References Cited

U.S. PATENT DOCUMENTS

Figure 1:
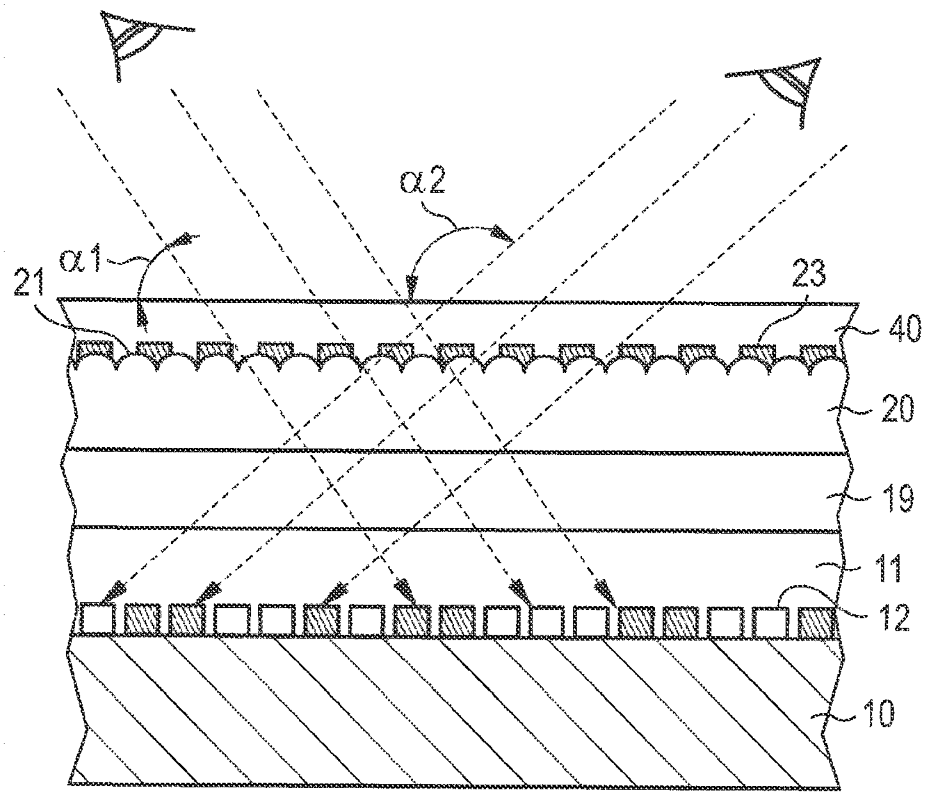

| | | | | |
|---|---|---|---|---|
| 10,913,300 | B2 | 2/2021 | Van Den Berg et al. | |
| 2007/0063053 | A1* | 3/2007 | Bergmann | B42D 25/435 235/487 |
| 2017/0326900 | A1 | 11/2017 | Fuhse et al. | |

FOREIGN PATENT DOCUMENTS

| | | | | |
|---|---|---|---|---|
| WO | WO-2014096167 | A1 * | 6/2014 | B41M 3/14 |
| WO | WO-2018093251 | A1 * | 5/2018 | B41M 3/148 |

OTHER PUBLICATIONS

KR20170029882A English Translation (Year: 2017).*
International Preliminary Report on Patentability from International Application No. PCT/EP2020/025044 dated Jul. 27, 2021.
Translation of International Preliminary Report on Patentability from International Application No. PCT/EP2020/025044 dated Jul. 27, 2021.
Written Opinion of the International Search Authority from International Application No. PCT/EP2020/025044 date of mailing Mar. 16, 2020.
Translation of Written Opinion of the International Search Authority from International Application No. PCT/EP2020/025044 date of mailing Mar. 16, 2020.
International Search Report from International Application No. PCT/EP2020/025044 date of mailing Mar. 16, 2020.
Translation of International Search Report from International Application No. PCT/EP2020/025044 date of mailing Mar. 16, 2020.
Machine Translation of DE 102011117677 A1.

* cited by examiner

IDENTIFICATION DOCUMENT HAVING BIOMETRIC IMAGE INFORMATION

The invention relates to an identification document with biometric image information. In particular, the invention relates to an identification document with a carrier on which image information of a person is rendered in a personalization region.

From EP1044826 A1 a multilayer data carrier is known on which image information is formed. The data carrier can in particular be an identity card, the image information in particular a portrait photo of an authorized owner of the identity card. The image information consists on the one hand of a color image applied to the surface of a substrate, which in turn is arranged on a carrier layer. On the other hand, the image information consists of image points configured in the substrate layer or on the carrier layer. The image points consist of recognition-relevant features of the original image. In one variant, the image points with the recognition-relevant features are inscribed into the substrate by means of laser radiation.

From WO 2018/093251 A1 a security document is known which carries a main image of a holder as well as additionally an authentication image of the holder. The authentication image is placed under a lens arrangement and consists of the superimposition of a negative and a positive of the main image. The authentication image is a tilt image that alternates between two states. Depending on the viewing angle, it shows the positive or the negative. Positive and negative are produced with a laser through the lens arrangement. In order to facilitate the assignability of the same image elements to negative and positive, reference points can be provided for orientation, e.g. at eyes or mouth. The arrangement allows subsequent changes to the images to be easily recognized. Added dark elements stand out compared to the negative.

From DE 112002102475 T5 a security element for flexible security documents with a multi-channel printed tilt image that changes between a plurality of states is known. The tilt image possesses several partial regions that depending on the viewing angle produce different optically variable images, in particular complementary images. The image elements of the partial regions are respectively assigned to a lens element. They are arranged mutually offset taking into account the lens parameters, so that different states of the images are visible at different viewing angles. The result is a complex positive-negative state change effect that cannot be easily imitated by printing technology. In one embodiment, the image elements are pixels of a photo and are dimensioned in relation to the lens parameters such that when viewed there is a quasi-continuous transition from one final state of the image to the other.

From EP 1044826 A1 a data carrier employable as an identity card is known, to which there is applied a portrait photo as the original image as well as additional recognition-relevant features obtained from the original image. The recognition-relevant features are characteristic facial features. They can also have the form of a line drawing. The recognition-relevant features are applied in a fashion separately from the original image by means of a laser system. They superimpose the original image in a precisely fitting fashion or are incorporated separately into a special effect region of the data carrier. The special effect region may be a region prepared for tilt image effects.

It is the object of the invention to further increase the forgery resistance and to improve the longevity of an identification document.

This object is achieved by an identification document having features of the main claim. The identification document of the invention has the advantage that a distinct vivid, three-dimensional overall impression of the biometric image information arises for a viewer in the perception of the image information combined from base image and derivative image. The highly vivid, three-dimensionality improves the recognizability of the geometric relationships and forms in an image compared to merely highlighting light and dark in positive-negative effects. It is exactly the recognizability of the geometric relationships and forms in an image on which the recognition of an image information itself is based. By supporting this by highlighting elements that are essential for recognition, the invention allows a particularly fast and secure visual recognition of image information or of a manipulation thereof.

The targeted emphasis on individual biometric features in the derivative image also makes the so-called morphing more difficult, i.e. the computer-assisted ascertainment of an illustration, in particular a photo, that has sufficient similarity to two different persons so that both persons can utilize the same image to prove their identity.

The identification document of the invention further has the advantage that the biometric image information is very long-term stable. Since two intrinsically different images have to be created, the identification document is difficult to imitate and the forgery resistance is increased. By the image information being located within the identification document, it possesses a long longevity.

Advantageously, the biometric image information consists of the basic information and additional information coordinated therewith, which is formed on or above the lens arrangement. Advantageously, the basic information holds a black and white photo, the additional information a corresponding color photo.

A practical advantage of the invention is that for its implementation no elaborate new equipment and no special materials are required. The implementation is therefore cost-effective.

Among other things, the invention makes those manipulations of identification documents more difficult that are directed to the superimposition of only certain parts of a biometric image information that are essential for recognition, e.g. eyes, nose and mouth in a photo, with manipulated new image information, in the expectation that the otherwise unchanged image information can simulate overall authenticity.

The method of the invention makes it possible to record a brilliant, high-resolution color or black-and-white image on a data carrier and thus produce a high forgery resistance by incorporating in targeted fashion, in addition to the base image, specific recognition-relevant image elements, e.g. in the form of a line drawing, a version of the base image which is particularly accentuated or filtered in parts of the image, or a negative image which follows certain image contours, as further components into the inner structure of the data carrier.

An embodiment example of the invention will hereinafter be explained more closely with reference to the drawings.

Figure 2:
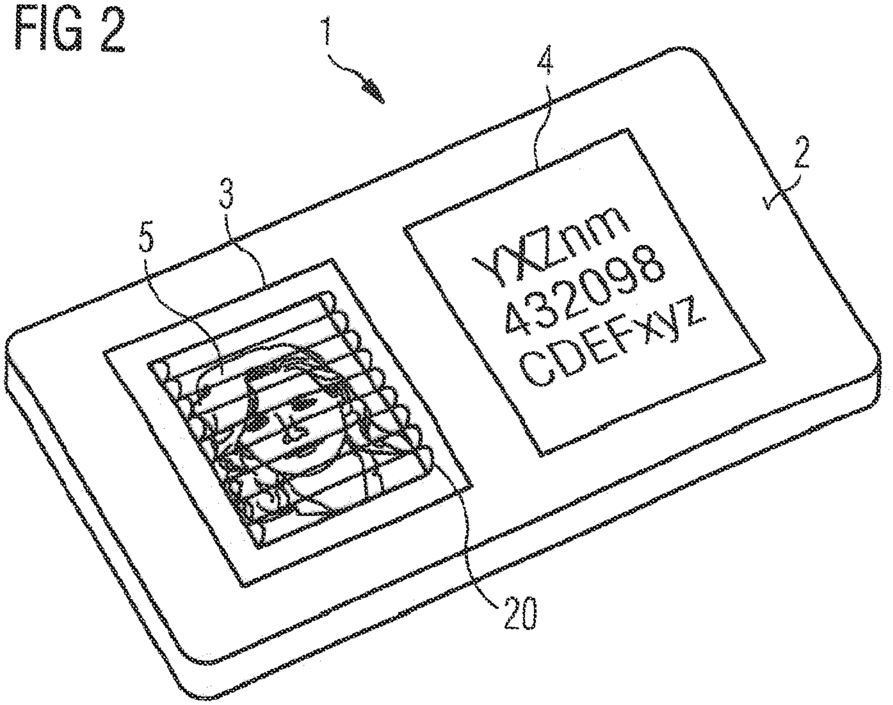
Figure 3:
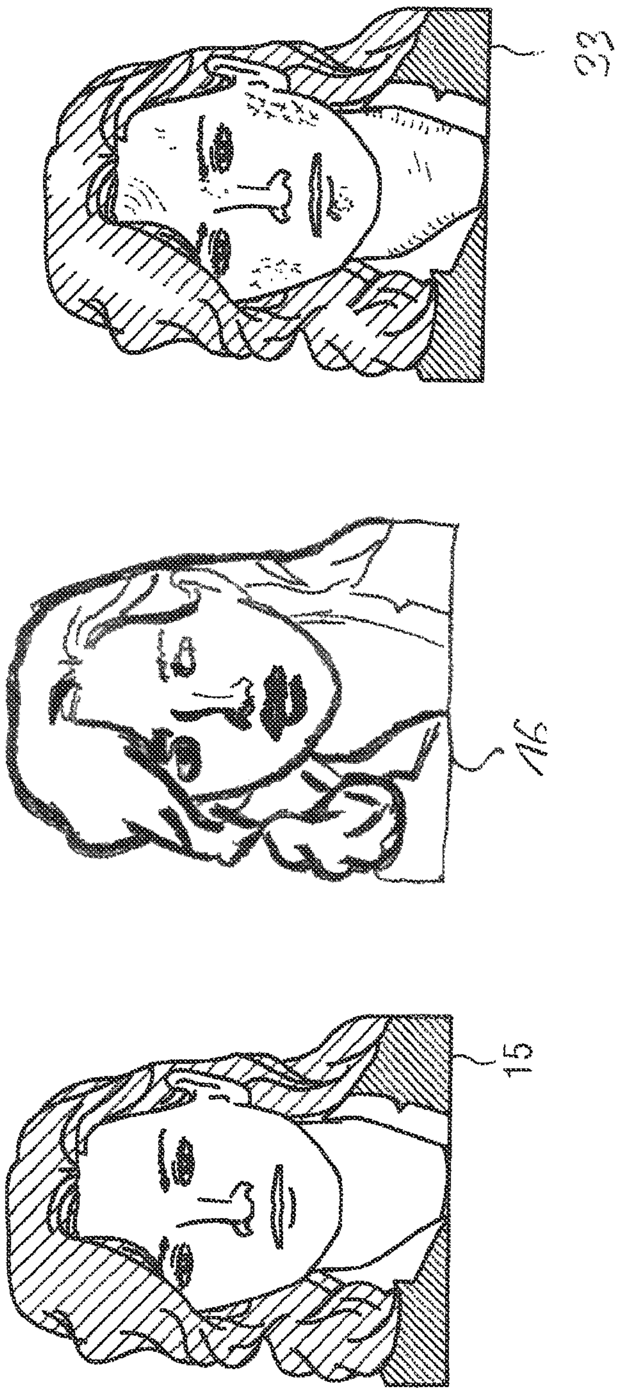
Figure 4:
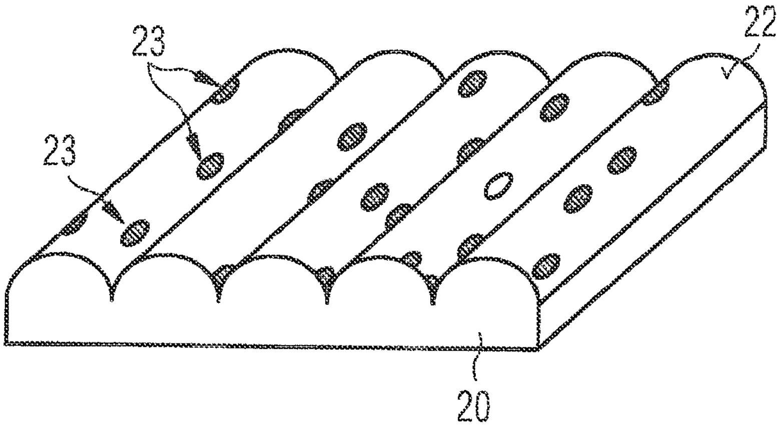
Figure 5:
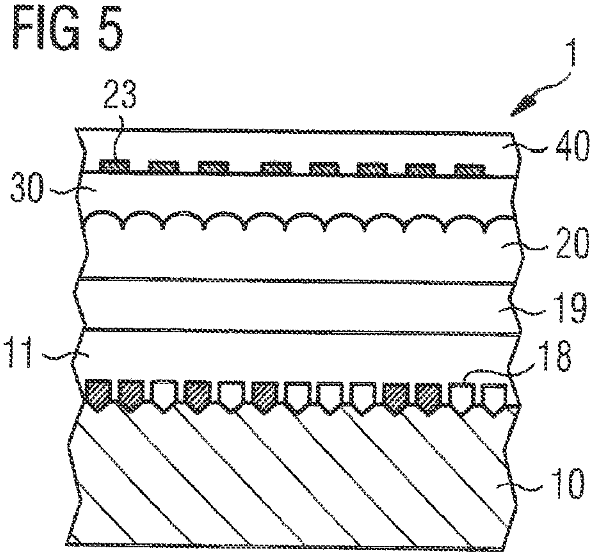

There are shown:

FIG. 1: a cross-section through an identification document,

FIG. 2: a perspective top view of an identification document designed as a data page, FIG. 3: a base image, a derivative image and a complementary image, FIG. 4: a lens arrangement with applied additional information, FIG. 5: a variant of the structure of an identification document.

FIG. 1 shows a schematic representation of an identification document 1 of the invention in cross-section, which is not true to scale. The identification document 1 is typically an identity card, e.g. a national identity document in credit-card format, or a data page in a passport booklet. However, it can also be present in other designs, for example in the shape of a key pendant.

The identification document 1 has a carrier 10 on which a recording layer 11 is arranged, over which an intermediate layer 19 is located. Over the intermediate layer 19 a lens arrangement 20 is formed. Over the lens arrangement 20 a cover layer 40 may optionally be formed.

The layers 10, 11, 19, 20 are typically interconnected by lamination. With an embodiment as a data page of a passport booklet, the identification document 1 typically has a total thickness of 500 to 900 μm.

As represented in FIG. 2, the identification document 1 has a biometric personalization region 3 and a bibliographic personalization region 4 on its upper side 2. The biometric personalization region 3 comprises biometric image information 5. The biometric image information 5 has basic information 12 which comprises a base image 15 and derivative image 16 and may further comprise additional information 23 which is formed on or over the lens arrangement 20.

The biometric image information 5 may in particular be a photo of an authorized holder, preferably a color photo. In the bibliographic personalization region 4, for example, the name, address, date of birth of the holder and a serial number in the form of alphanumeric characters are stored.

The lens arrangement 20 is arranged at least partly in the biometric personalization region 3. Preferably, the lens arrangement 20 completely covers the biometric personalization region 3. The lens arrangement 20 causes different images to be recognizable under the lens arrangement 20 depending on the viewing angle α1, α2. When the viewing angle is changed, one image transitions into the other. Depending on the viewing angle, the different images superimpose for a viewer, with a first image dominating the overall impression at a first defined viewing angle α1 and a second image dominating at a second defined viewing angle α2.

The carrier 10 typically consists of a single-layer or multi-layer plastic layer in a card format. Instead of plastic, also other materials are possible, for example paper. Expediently, the carrier 10 is opaque. If the identification document 1 is a data page of a passport booklet, the thickness of the carrier 10 is typically 100 to 500 μm.

The recording layer 11 is preferably a plastic layer. Expediently, it is transparent or translucent. The recording layer 11 can be designed as a foil or as a lacquer layer. If the identification document 1 is a data page of a passport booklet, the thickness of the recording 11 is typically 5 to 100 μm, expediently 5 to 50 μm.

On or in the recording layer 11, basic information 12 is formed. The basic information 12 holds graphic information 13, in particular a photo; optionally, it can also hold alphanumeric characters 14. The basic information 12 consists of a base image 15 and a derivative image 16. The basic information 12 is arranged such that in the finished identification document 1 it is located below the lens arrangement 20. Base image 15 and derivative image 16 are preferably formed in or on the same layer within the data page.

Expediently, the recording layer 11 is laserable. For this purpose, it is doped with carbon black, for example. The basic information 12 can then be incorporated into the recording layer 11 with high location precision by means of a suitable laser. The information production is effected for example by blackening in order to produce image points 18. The image points 18 can be round, but can also have the shape of strokes or lines, or they can be based on other basic forms. The basic information 12 is typically produced on the recording layer's 11 underside 17 facing the carrier 10. The individual image points 18 have a spatial dimension as indicated in FIG. 5 and typically extend into the recording layer 11. Typically, the spatial shape of the individual image points 18 resembles a cone tip when manufactured by laser. Furthermore, image points 18 may extend partially into the carrier 10, as indicated in FIG. 1.

The intermediate layer 19 likewise consists of plastic and is transparent. Expediently, it is non-laser-sensitive, but it can be laser sensitive. It is optional and can also be omitted. If it is present, its thickness expediently is 100 to 200 μm.

The lens arrangement 20 consists of a transparent plastic layer in whose surface a lenticular grid 21 is formed. The plastic layer expediently extends over the entire carrier 10. The lenticular grid 21 expediently covers only part of the plastic layer. It is placed in such a way that in the finished identification document 1 it is located above the basic information 12 and that the latter is visible through the lens arrangement 20.

Expediently, the lenticular grid 21 consists of cylindrical lenses extending in parallel along the upper side 2. These can be aligned on the upper side 2 in any direction, for example horizontally, vertically or at an angle of 45° to the longitudinal axis of the identification document 1; the longitudinal axes of the cylindrical lenses may lie side by side on parallel straight lines or may follow curved or kinked lines and run e.g. in a wave form. For an identification document 1 in the form of a data page for a passport booklet, the pitch of the lens grid 21 is e.g. 100 μm to 200 μm. The lenticular grid 21 may also have multiple partial regions in which the respective sub-lenticular arrangements 20 are aligned differently; for example, the partial regions may be aligned in the form of a herringbone pattern. As an alternative to cylindrical lenses, other lens forms can also be considered, for example spherical lenses.

Directly on the surface 22 of the lens arrangement 20 there is applied graphic and/or alphanumeric additional information 23, as indicated in FIG. 4. Preferably, the additional information 23 includes a complementary image 33 that corresponds to the base image 15 and interacts with it when viewed. Preferably, the complementary image 33 contains further information that supplements the information included in the base image 15. For example, as indicated in FIG. 3, the complementary image 33 may be a colored version of the base image 15 when the base image 15 is a black and white image; in a further expedient embodiment, the complementary image 33 includes the color separation for a black and white base image 15 so that the two together result in a color image.

The complementary image 33 is arranged in a defined location in relation to the base image 15 and derivative image 16.

The application of the additional information 23 is expediently effected by printing, e.g. by inkjet method. As illustrated in FIG. 4, the image points 18 of the additional information 23 also arise in particular on downward flanks of the lens arrangement 20 and in the valleys between the lens tops.

Basic information 12, i.e. base image 15 and derivative image 16, and additional information 23 together form biometric image information 5 for a viewer.

The images recognizable through the lens arrangement 20 are established by the additional information 23 applied to the lens arrangement 20 and the basic information 12 incorporated in the recording layer 11.

The basic information 12 consists of two portions. The first portion defines the base image 15. The base image 15 is expediently a photo of the holder of the identification document 1. Expediently, the photo is a black and white image. The second portion of the basic information 12 defines the derivative image 16.

The derivative image 16 is an image derived from the base image 15 or corresponding to the base image 15. The derivative image 16 shows a base image's 15 constituent that is essential for recognition or accentuates or emphasizes such a constituent that is essential for recognition. For this purpose, the derivative image 16 holds or emphasizes, by a suitable change, constituents of the base image 15 which are essential or particularly suitable for a secure and fast objective and subjective recognition of the person or object depicted in the image by a viewer. Expediently, such changed constituents are biometrically unchangeable, preferably individual features, such as eye color, liver spot, birthmarks, cheek dimples or scars. If at least one individual feature that is usually not present in a similar form in other persons, such as the location of a liver spot or birthmark, is systematically emphasized this effects an additional protection against morphing.

In one embodiment, the derivative image 16 may comprise only the contours of the image content reduced to strokes or lines. Here, a selection of lines or contours may be made, for example only eyebrows or liver spots or the form of a chin may be rendered as particularly strong lines. The selected lines or contours can be additionally changed, for example can be formed stronger than in the base image or weaker or in a different color. Or the derivative image 16 consists of an enhancement of contours with a simultaneous reduction of the gray tones or intermediate colors included in the base image.

The derivative image 16 may also render another component of the base image 15 in an emphasized fashion, such as an item of clothing or eyeglasses. The derivative image 16 may also be based on a negative image.

The derivation of the derivative image 16 may be effected by means of suitable filters. In one expedient embodiment, the derivative image results from producing a 3-D image from a two-dimensional base image. The selection of the constituents included in the derivative image 16 and/or their suitable change is expediently effected in targeted fashion with regard to effectively supporting the subjective recognizability by a viewer.

Base image 15 and/or derivative image 16 may hold, besides the biometric image content, additional security information. Such additional security information may, for example, consist of a guilloche or text pattern forming the image background. The additional security information may also be an individual personal date, e.g. the date of birth. Both portions of the basic information 12, base image 15 and derivative image 16, are expediently formed by a side-by-side arrangement of the individual image points 18 in the same plane on the underside 17 of the recording layer 11 or in the recording layer 11.

When viewing the biometric information 5 through the lens arrangement 20—together with the additional information 23—basically both portions of the biometric basic information 12, i.e. base image 15 and derivative image 16 are visible at the same time. If the information 12 is viewed through the lens arrangement 20 at a first defined viewing angle α1, the overall impression is dominated by the base image 15, if it is viewed at a second defined viewing angle α2, the overall impression is dominated by the derivative image 16. In particular when there is a transition between the two defined viewing angles, the base image 15 and derivative image 16 superimpose for a viewer such that a distinct plastic overall impression of the biometric image information arises for a viewer in the perception of the image information combined from base image and derivative image. By slightly tilting the identification document 1 back and forth, the overall impression of high plasticity is enhanced. This supports and facilitates the identification of a person depicted on the base image with a living person.

The arrangement of the different image information items in a certain local and spatial position in relation to each other also increases the protection against falsification of the image information altogether, by the information items additionally incorporated, besides the base image, being directly connected to the base image and thus making immediately recognizable any attempt to change the original or base image as a manipulation.

For the manufacture of an identification document, expediently a carrier 1 is provided which already has personalization regions 3, 4 and a lens arrangement 20. I.e. an identification document 1 is provided that is finished except for the personalization.

Further, a base image 15 is provided, i.e. a photo of the holder of the identification document. From the base image 15, expediently computationally using suitable filters or transformation functions, a derivative image 16 is derived from the base image 15, which shows or accentuates a constituent of the base image 15 that is essential for recognition.

The base image 15 and derivative image 16 are then expediently incorporated into the recording layer 11 in one operation. Expediently, base image 15 and derivative image 16 are produced through the lens arrangement 20. Preferably, the production is made by means of a laser.

Alternatively, the position of the portions of the biometric basic information 12 can be calculated based on the geometry of the lens arrangement 20. The information which is expediently present in the form of image points 18 can then be lasered or also applied by printing technology. Such an application by printing technology may expediently be effected to the underside 17 of the recording layer 17 before it is connected to the carrier 10.

The base image 15 is incorporated in such a way that upon viewing at a first defined viewing angle α1 it is recognizable or dominates the overall impression, and the derivative image 16 in such a way that upon viewing at a second defined viewing angle α2 it is recognizable or dominates the overall impression.

The complementary image 33 is expediently applied by printing technology directly onto the surface 22 of the lens arrangement 20. The inks used are preferably non-laser-sensitive. The inking is effected in such a way that image points 18 of the complementary image 33 also arise in particular on the flanks of the lens arrangement 20 and in the valleys between the lens tops.

When using non-laser-sensitive inks, the application of the complementary image 33 can be effected before the formation of the biometric image information 12 of the recording layer 11. Carrying out the formation of the biometric basic information 12 can then be guided by the already existing complementary image 33. Alternatively, the biometric basic information 12 may be created first and the complementary image 33 then coordinated with the location of the base image 15 and/or derivative image 16.

FIG. 5 schematically shows a variant of a structure of an identification element 1. In contrast to the embodiment according to FIG. 1, in the variant according to FIG. 5 an image carrier layer 30 is formed over the lens arrangement 20 and the additional information 23 is not printed on the lens arrangement 20 but on the image carrier layer 30. Over the image carrier layer 30 there is expediently located a cover layer 40.

The image carrier layer 30 consists of a transparent plastic layer. If the identification document 1 is a data page of a passport booklet, the thickness of the image carrier layer 30 is typically from 5 to 100 μm. In one variant, the image carrier layer 30 is a lacquer layer with a thickness of 5 μm to 20 μm, which follows the contour of the lens arrangement 20. The image points 18 of the additional information 23 are again located in particular on downward flanks of the lens arrangement 20 or in valleys between the lens tops.

The cover layer 40 likewise consists of a transparent plastic layer. If the identification document 1 is a data page of a passport booklet, the thickness of the cover layer 40 is typically from 5 to 100 μm. The top layer 40 acts in particular as a protective layer.

While maintaining the fundamental idea of improving identifiability, longevity and forgery resistance of biometric image information 12 by arranging a base image 15 and a derivative image 16 derived therefrom under a lens arrangement 20 in such a way that at a first certain viewing angle α1 the image impression is determined by the base image 15 and at a second certain viewing angle α1 the image impression is determined by the derivative image 16, so that upon viewing the image information combined from base image 15 and derivative image 16 with the unarmed eye, a plastic overall impression with great depth arises, the above-described solution permits further embodiments which are not described in detail here.

In particular, the described embodiment examples are not to be understood as limited to the embodiments and element combinations shown in the Figures. Rather, it is readily possible to combine individual elements of the embodiment examples in another form.

Furthermore, the parameters of the embodiments may be varied from those represented. For example, the layer sequences described in the embodiment examples can be varied in many ways in terms of material and thickness and supplemented with further layers. There is a variety of further possibilities for deriving the derivative image 16 from the base image 15. It is also possible, among other things, that the base image 15 itself is a derivative of the complementary image 33.

The invention claimed is:

1. An identification document with a carrier (10) which has a personalization region (3) comprising biometric image information (5), the personalization region (3) having a recording layer (11) adapted to receive the biometric image information and having a lens arrangement (20), the viewing of the biometric image information (5) being effected through the lens arrangement (20), wherein the biometric image information (5) comprising basic information (12) which comprises a base image (15) which is dominantly recognizable at a first viewing angle (α1) as well as a derivative image (16) which is dominantly recognizable at a second viewing angle (α2), the derivative image (16) being derived from the base image (15) and showing or emphasizing a constituent of the base image (15) which is essential for recognition, so that a vivid, three-dimensional combined image arises, wherein additional information (23) comprises a complementary image which is formed on or above the lens arrangement (20), and is coordinated with the basic information (12), wherein the biometric image information (5) is formed by superposition of the basic information (12) and the additional information (23).

2. The identification document according to claim 1, characterized in that the derivative image (16) shows contours of the base image (15) emphasized or shows only the contours of the base image.

3. The identification document according to claim 2, characterized in that the derivative image (16) shows characteristic contours or facial features obtained from the base image (15).

4. The identification document according to claim 1, characterized in that the derivative image (16) is based on a negative image of the base image (15).

5. The identification document according to claim 1, characterized in that the derivative image (16) is a two-dimensional rendition of a three-dimensional image.

6. The identification document according to claim 1, characterized in that the derivative image (16) is derived from the base image (15) by spatial analysis.

7. The identification document according to claim 1, characterized in that the image information is monochrome, in particular black and white information.

8. The identification document according to claim 1, characterized in that the lens arrangement (20) is formed from cylindrical lenses or from spherical lenses.

9. The identification document according to claim 1, characterized in that the additional information (23) is applied directly to the lens arrangement (20) by printing.

10. The identification document according to claim 1, characterized in that the basic information (12) has a biometric image content as well as additional security information.

11. The identification document according to claim 10, characterized in that the additional security information is an individual personal date, e.g. the date of birth.

12. A method for manufacturing the identification document of claim 1 comprising: providing the carrier with the personalization region comprising the recording layer (11) and the lens arrangement (20); forming the base image on or in the recording layer (11) so that it is recognizable at the first viewing angle, α1; deriving from the base image (15) the derivative image (16), which shows or emphasizes the at least one constituent of the base image (15) essential for recognition; forming the derivative image (16) on or in the recording layer (11) so that it is recognizable at the second viewing angle, α2; and wherein the base image (15) and the derivative image (16) are produced through the lens arrangement (20).

13. The method of claim 12 wherein the derivative image (16) shows contours of the base image emphasized or shows only the contours of the base image.

14. The method of claim 12 wherein the derivative image (16) shows characteristic contours or facial features obtained from the base image.

15. The method of claim 12 wherein the derivative image (16) is based on a negative image of the base image (15).

16. The method of claim 12 wherein the derivative image (16) is a two-dimensional rendition of a three-dimensional image.

17. The method of claim 12 wherein the derivative image (16) is derived from the base image (15) by spatial analysis.

18. The method of claim 12 wherein the image information is monochrome, in particular black and white information.

19. The method of claim 12 wherein the lens arrangement (20) is formed from cylindrical lenses or from spherical lenses.

20. The method of claim 12 wherein the additional information (23) is applied directly to the lens arrangement (20) by printing.

* * * * *